Jan. 15, 1952     E. C. McKEEVER     2,582,644
LINEAL MEASURING DEVICE FOR ELONGATED OBJECTS
Filed June 9, 1950
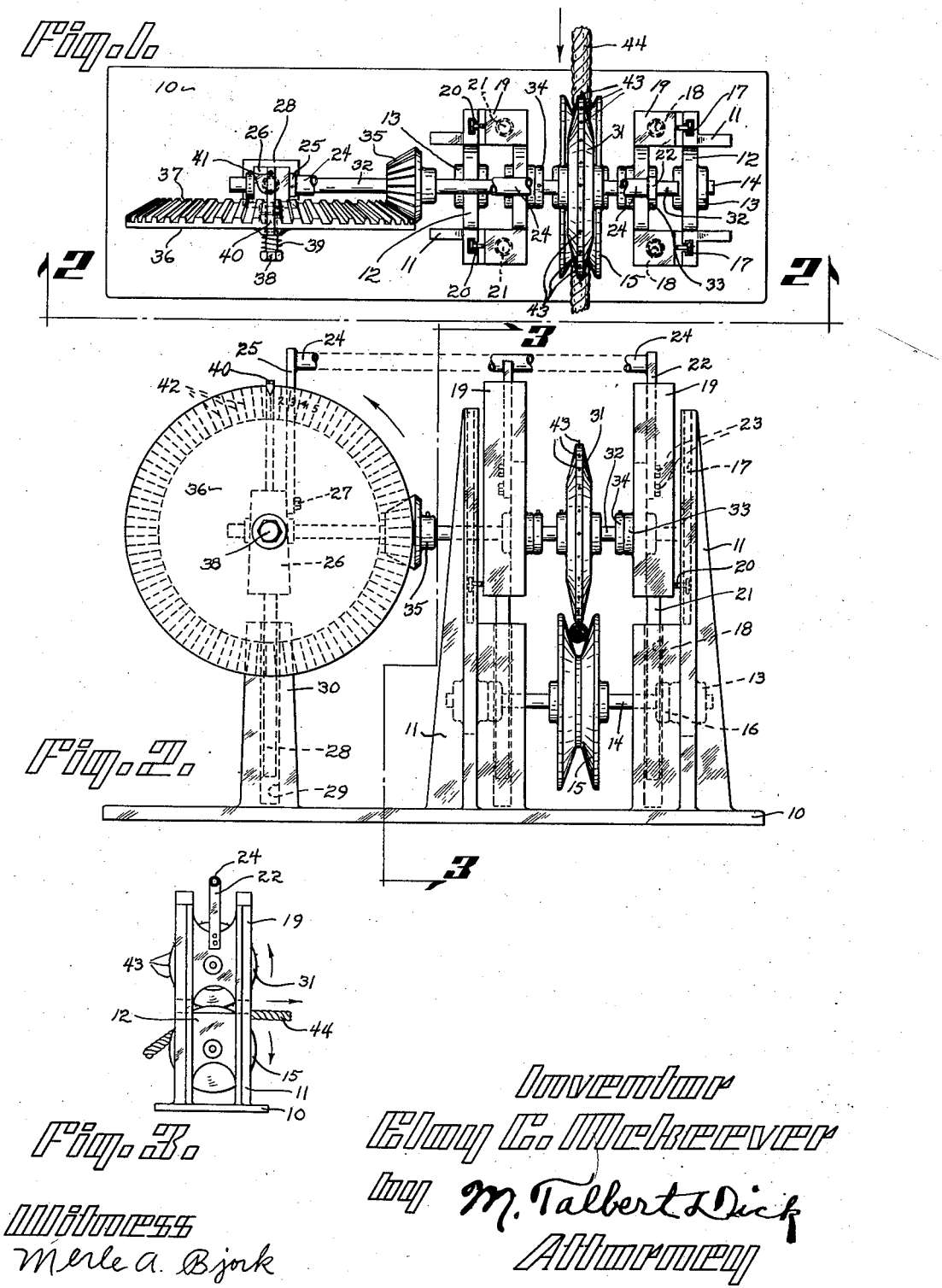

Patented Jan. 15, 1952

2,582,644

UNITED STATES PATENT OFFICE 2,582,644

LINEAL MEASURING DEVICE FOR ELONGATED OBJECTS

Eloy C. McKeever, Des Moines, Iowa, assignor of one-half to Frank A. Dapolonia, Des Moines, Iowa Application June 9, 1950, Serial No. 167,156

3 Claims. (Cl. 33—134)

There are many materials which are of elongated character and sold by lineal measure such as rope, hose, Romex cable or the like. Frequently, these elongated objects are stored on reels or in rolls. Because they are so stored, they have a tendency to retain a curved shape, particularly that portion which lies near the center of the reel or roll. This tendency to curl or remain curved makes it difficult to measure the length of these materials against a flat ruler, yard stick or similar flat measuring device. In spite of the difficulty in so measuring these elongated materials, a flat or rigid measuring device of some kind against which a length of the material is matched, comprises substantially the only technique for measuring these objects, at least at the retail level. Because it is difficult to measure these objects in this manner, errors frequently occur in the sale of rope, Romex cable or the like. It is even possible unless care is used that the purchaser may get less than he bargains for. In some instances where a specific length of material is necessary, a shortage is very obvious and is apt to cause a misunderstanding and hard feelings. Such shortages are apt to cause loss of good will and customers. For this reason, retailers usually feel compelled to give their customers more footage than is actually purchased. Such practices naturally reduce the margin of profit in selling such elongated materials as hose, rope and the like. Even were it possible to make these measurements exact, the objection to known techniques would still exist, i. e., it is a slow and in terms of time, a costly method of measuring. A method of measuring directly from the stored roll for example, as the material passed a given point, would be very desirable therefor.

Furthermore this same difficulty exists at a manufacturing level. Present manufacturing techniques for most of these elongated objects is a continuous process of predetermined lengths cut as they are manufactured. It is particularly important, therefore, that the manufacturers of such objects have a method of continuously recording the length of the material as it flows from the automatic machine. It would be possible to cut off long lengths and measure them after they have been removed from the machine, but it is particularly valuable from a space saving point of view to be able to immediately roll the material on reels. A technique for measuring the material directly as it flows from the machine, therefore, to determine how much had been rolled on any given roll, would be particularly valuable. There are machines of a sort which so measure these elongated materials now, but because of their character, however, they are subject to error. In one known case, the slippage of the machine causes a measurement error of approximately five feet in every 100. Although such a measuring error would not be important to most retailers, to a manufacturer who produces many thousands of feet of his product each year, an error of five per cent would represent a substantial loss in revenue.

All of this type of item comes in a wide range of diameters, furthermore, which adds another problem to those faced by an inventor of a machine for measuring these elongated objects. If such a measuring device could be constructed so that it could easily and quickly adapt itself to units of different diameters, it would be particularly valuable.

In view of all the problems and difficulties indicated above, therefore, it is the principal object of my invention to provide a device for the lineal measuring of elongated objects that will continuously and accurately measure them.

It is a further object of my invention to provide such a lineal measuring device for elongated objects that will measure objects of various diameters. It is yet a further object of my invention to provide such a lineal measuring device for elongated objects that is durable in use and inexpensive to manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of my lineal measuring device with a fragment of an elongated object shown as it would appear in passing through the device. A portion of the device is broken away to more fully illustrate its construction, Fig. 2 is a side view of my lineal measuring device taken on the line 2—2 of Fig. 1. Broken lines illustrate the floating character of the upper portion of the device and also show hidden elements. The divisions on the dial face and a portion of the operating handle are also shown in broken lines, Fig. 3 is a reduced size cross-sectional view of my lineal measuring device taken on the line 3—3 of Fig. 2.

Referring to the drawings, I have used the numeral 10 to designate the base portion of my base frame. Two pairs of vertical arms designated 11 extend upwardly from one end of the base 10. Each pair of arms is secured together by a web 12 in which are mounted the bearings 13. A shaft 14 is journaled in the bearings and supports the guide pulley 15. The location of the shaft 14 with respect to the bearings is determined by the retaining collars 16. The vertical arms are equipped with the T-slots 17 and the wells 18 which serve as a guide means for the auxiliary frame. The auxiliary frame is composed of the brackets 19 which have studs 20 and guide rods 21 which fit in T-slots and wells mentioned above. The brackets are secured together by the handle assembly which comprises the vertical bars 22 that are secured to the auxiliary frame brackets in any appropriate manner as by the cap screws 23 or the like. Lifting rod handle 24 is rigidly secured to the tops of the bars and extends beyond the brackets to a third vertical bar designated 25 that is fixed to the dial support block 26 in any appropriate manner as by cap screw 27. The guide rod 28 extends downwardly from the support block 26 and is embraced by the well 29 in the dial guide arm designated 30. This structure of the auxiliary frame permits it to move freely in a vertical path, the significance of which will be explained under heading of operation. A disk designated 31 is fastened to the shaft 32 which is journaled in any appropriate bearings such as those designated 33. The bearings 33 are rigidly secured to the brackets 19. Lateral movement of the shaft 32 is controlled by the collars 34. A beveled gear designated 35 is secured to the shaft which extends clear through to the dial support block 26. The counter mechanism comprises the dial 36 which has beveled teeth 37 formed on its back side, is rotatably secured to the support block in any appropriate manner as by the cap screw 38 or the like. A spring designated 39 yieldingly holds the gear teeth 37 of the dial 36 in contact with the beveled gear 35. A pointer designated 40 is rigidly secured to the guide support block 26 in any suitable manner as by the screws 41 to hold the pointer with its tip adjacent the dial markings designated 42. It will be noted that the disk 31 has a plurality of sharpened projections designated 43 rigidly secured thereto and extending radially therefrom. The purpose of these pointed projections will become clear in the discussion included under the heading operation.

In operation, my device is placed adjacent to the material to be measured. The operator then lifts the auxiliary frame by means of a lifting rod 24 which separates the guide pulley 15 and the disk 31 to permit the insertion of an object to be measured, here illustratively shown as the rope 44. The weight of the auxiliary frame and counting mechanism is then allowed to carry the disk down against the material, thus clamping it between the disk and the guide pulley. The sharpened character of the projections 43 causes them to pierce the outer surface of the material to be measured insuring a non-slip co-action between the material and the disk. The material is then drawn through the device either manually or mechanically which causes the disk 31 to rotate which supplies power to the beveled gear 35 which engages the dial and causes it to rotate as shown in Fig. 2. The dial marking records the number of lineal units of material which have passed through the machine and produced the described rotation of the disk and dial. When the desired length of material has been counted out, the operator cuts off the desired length, resets the dial to zero by manually disengaging the dial teeth 37 from the beveled gear 35 by pulling the dial forward and overcoming the tension of spring 39. The machine is then set for another operation.

Some changes may be made in the construction and arrangement of my lineal measuring device for elongated objects and method of making same without departing from the real spirit and purpose of my invention, and it is my intention to cover by my claims, any modified forms of structure or use of mechanical equivalents which may be reasonably included within their scope.

I claim:

1. In a lineal measuring device for elongated objects, a base, arms rigidly secured to said base in a spaced relationship and extending vertically therefrom; a V-type guide pulley mounted between said arms; said V-type guide pulley being solely rotatably moveable with respect to said arms; said arms having vertically arranged wells therein; and said arms having cross-sectionally shaped T-slots therein; said T-slots being parallel to and entirely above the wells in said arms, a handle rod, a pair of brackets rigidly secured to said handle rod in a spaced relationship and extending therefrom in the same direction and parallel to each other, guide rods rigidly secured to the lower portion of each bracket; said guide rods arranged to slidably engage the wells of said arms, T-guides extending from the sides of said brackets; said T-guides arranged to slidably engage said T-slots, a disc mounted between said brackets; said disc being solely rotatably moveable with respect to said brackets, and means on the edge of said disc for engaging members in contact with said disc edge to prevent slippage between said disc edge and a member in contact therewith.

2. In a linear measuring device for elongated objects, a base, arms rigidly secured to said base in a spaced relationship and extending vertically therefrom, a V-type guide pulley mounted between said arms; said V-type guide pulley being solely rotatably moveable with respect to said arms; said arms having vertically arranged wells therein; and said arms having cross-sectionally shaped T-slots therein; said T-slots being parallel to and entirely above the wells in said arms, parallel to each other, guide rods rigidly secured to said handle rod in a spaced relationship and extending therefrom in the same direction and a handle rod, a pair of brackets rigidly secured to the lower portion of each bracket; said guide rods arranged to slidably engage the wells of said arms, T-guides extending from the sides of said brackets; said T-guides arranged to slidably engage said T-slots, a disc mounted between said brackets; said disc being solely rotatably moveable with respect to said brackets; means on the edge of said disc for engaging members in contact with said disc edge and a member in contact therewith, a bar rigidly secured to said handle rod and extending therefrom in the same direction as said brackets in a spaced relationship and parallel thereto, a block secured to the lower end of said bar, a pointer fixed to said block, a dial rotatably secured to said block and having its edge adjacent said pointer, and means for rotating said dial in a fixed relationship in respect to rotation of said disc.

3. In a lineal measuring device for elongated objects, a base, arms rigidly secured to said base in a spaced relationship and extending vertically therefrom, a V-type guide pulley mounted between said arms; said V-type guide pulley being solely rotatably moveable with respect to said arms; said arms having vertically arranged wells therein; and said arms having cross-sectionally shaped T-slots therein; said T-slots being parallel to and entirely above the wells in said arms, a handle rod, a pair of brackets rigidly secured to said handle rod in a spaced relationship and extending therefrom in the same direction and parallel to each other, guide rods rigidly secured to the lower portion of each bracket; said guide rods arranged to slidably engage the wells of said arms, T-guides extending from the sides of said brackets; said T-guides arranged to slidably engage said T-slots, a disc mounted between said brackets; said disc being solely rotatably moveable with respect to said brackets, means on the edge of said disc for engaging members in contact with said disc edge and a member in contact therewith, a bar rigidly secured to said handle rod and extending therefrom in the same direction as said brackets in a spaced relationship and parallel thereto, a block secured to the lower end of said bar, a pointer fixed to said block, a dial rotatably secured to said block and having its edge adjacent said pointer, a hollow pillar extending verticaly from said base from a point directly below said block, and an elongated member rigidly secured to said block and extending straight downwardly therefrom; said elongated member slidably fitting within said hollow pillar.

ELOY C. McKEEVER.

REFERENCES CITED

The following references are of record in the file of this patent:

UNITED STATES PATENTS

| Number | Name | Date |
|---|---|---|
| 1,038,797 | Sommerfield | Sept. 17, 1912 |
| 1,162,752 | Colley | Dec. 7, 1915 |
| 1,225,223 | Davis | May 8, 1917 |